(12) United States Patent
Shin et al.

(10) Patent No.: US 7,474,303 B2
(45) Date of Patent: Jan. 6, 2009

(54) COLOR-SPOKE PROCESSING APPARATUS AND METHOD USABLE WITH SEQUENTIAL COLOR DISPLAY DEVICES

(75) Inventors: Yoon-cheol Shin, Seongnam-si (KR); Moon-cheol Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 756 days.

(21) Appl. No.: 11/142,281

(22) Filed: Jun. 2, 2005

(65) Prior Publication Data

US 2005/0276471 A1 Dec. 15, 2005

(30) Foreign Application Priority Data

Jun. 9, 2004 (KR) .................. 10-2004-0042152

(51) Int. Cl.
*G09G 5/00* (2006.01)
(52) U.S. Cl. .................. 345/204; 345/83; 345/88; 345/89; 345/690
(58) Field of Classification Search ............. 345/83–98, 345/204–215, 600, 690–699
See application file for complete search history.

(56) References Cited

U.S. PATENT DOCUMENTS

| 6,324,006 | B1 | 11/2001 | Morgan |
| 6,567,134 | B1 | 5/2003 | Morgan |
| 2008/0129900 | A1 * | 6/2008 | Sharp et al. .................. 349/15 |

FOREIGN PATENT DOCUMENTS

| EP | 1227687 A2 | 7/2002 |
| JP | 2002-82652 | 3/2002 |
| WO | WO 2005/018237 | 2/2005 |

OTHER PUBLICATIONS

Dutch Search Report dated Dec. 11, 2007 issued in NL 1029223.
Japanese Office Action dated Jan. 16, 2007 issued in JP 2005-170182.

* cited by examiner

*Primary Examiner*—Vijay Shankar
(74) *Attorney, Agent, or Firm*—Stanzione & Kim, LLP

(57) ABSTRACT

A spoke-processing apparatus usable with sequential color display devices using spokes depending on a color saturation and a luminance of an input color signal. A spoke-processing method usable in sequential color display devices using the spokes includes calculating a color saturation of an input color signal and determining whether the calculated color saturation is less than or equal to a first threshold, determining whether the input color signal has a luminance that is greater than a second threshold when the calculated color saturation is determined to be less than or equal to the first threshold, determining whether to increase the luminance of the input color signal using spoke areas when the luminance of the color input signal is greater than the second threshold and the calculated color saturation is less than or equal to the first threshold and calculating a signal adjustment ratio to intensify or lessen the input color signal based on whether the luminance of the input color signal is increased by the spoke areas, and outputting an output color signal having luminance of respective color components intensified or lessened according to the calculated signal adjustment ratio.

45 Claims, 11 Drawing Sheets

COLOR-SPOKE PROCESSING APPARATUS AND METHOD USABLE WITH SEQUENTIAL COLOR DISPLAY DEVICES

CROSS-REFERENCE TO RELATED APPLICATIONS

This application claims the benefit under 35 U.S.C. § 119 from Korean Patent Application No. 2004-42152, filed on Jun. 9, 2004, the entire contents of which are incorporated herein by reference.

BACKGROUND OF THE INVENTION

1. Field of the Invention

The present general inventive concept relates to a spoke-processing apparatus and a method usable with sequential color display devices. More particularly, the present general inventive concept relates to a spoke-processing apparatus and a method usable with sequential color display devices which use spokes depending on an extent of a color saturation and a luminance of a color signal.

2. Description of the Related Art

A spoke on a color wheel refers to a region between a location where the beam spot hits a boundary of a current color segment of the color wheel and a location where the beam spot hits a boundary of the next color segment. That is, the spoke is a transition area between neighboring color segments of the color wheel in which the colors of the neighboring segments are blended.

U.S. Pat. No. 6,324,006B1 discloses spokes and re-capturing of light emitted in spoke areas in a sequential color imaging system. More specifically, the U.S. Pat. No. 6,324,006B1 discloses an image-forming method comprising steps of: sequentially emitting color signals to pass through at least two single-colored segments and at least one spoke area, converting the color signal that passes through the spoke area into composite color data, and focusing each converted signal to form multi-colored images. The U.S. Pat. No. 6,324,006B1 provides an improvement of image brightness that can be achieved by using the spoke areas in the color wheel-driven display device.

FIG. 1A is a block diagram illustrating a conventional color display device using spokes in a color wheel.

As illustrated in FIG. 1A, the conventional color display device has an 8-bit RGBW processor 110, a RGBW split bit generator 120, a white-level sensor 130, a spoke bit generator 140, and a digital micro-mirror device(DMD) format converter 150.

As illustrated in FIG. 1A, the 8-bit RGBW processor 110 splits a 24-bit RGB input signal into a 24-bit red (R), green (G), and blue (B) color signal and an 8-bit white (W) color signal. The RGBW split bit generator 120 converts the red, green, and blue color signal and the white color signal received from the 8-bit RGBW processor 110 into a 48-bit RGBW including split-bits (i.e., 48 bit white) to drive the digital micro-mirror device (DMD). The white-level sensor 130 divides gray levels that are higher than a gray level of 144 (out of gray levels 0 to 255) into 16 gray levels (e.g., 144, 151, 158, etc.), and detects the 16 gray levels. In particular, the white level sensor 130 detects one of the 16 gray levels as a gray level of the 8-bit white color signal received from the 8-bit RGBW processor 110.

The spoke bit generator 140 calculates an amount of white color to be added to an input color signal according to the detected gray level of the 8-bit white color signal. That is, assuming that the white color results when all lights from the spokes Srw—spokes between red and white color segments, Swg—spokes between white and green color segments, Sgb—spokes between green and blue color segments, and Sbr—spokes between blue and red color segments are mixed, the spoke bit generator 140 calculates the amount of the white color to be added to the input color signal. The DMD format converter 150 uses the amount of the white color calculated by the spoke bit generator 140 to be added to the input color signal and the split 48-bit RGBW signal for format conversion necessary to drive the DMD.

FIG. 1B is a view illustrating a comparison between a luminance of output images when the spoke areas are used (i.e., turned on) and when the spoke areas are not used (i.e., turned off).

As illustrated in FIG. 1B, line A represents an input-to-output luminance when the spoke areas are not used, and line B represents an input-to-output luminance when the spoke areas are used.

FIG. 1B illustrates that the luminance is increased when the spoke areas are used, compared to when the spoke areas are not used. As mentioned above, the luminance of the input color signal can be improved when the spoke areas are used as compared to when the spoke areas are not used. However, an expansion of color ranges is relatively limited since the spoke areas are only applied to a luminance range.

Further, if the white color is added to the input color signal, the line B causes an image signal to be nonlinear including 16 steps starting from the gray level 144, since when a gray level of the input color signal is higher than a predetermined gray level (i.e., the gray level 144), the gray level of the input color signal is divided into 16 gray levels and the white color is only added to the 16 gray levels. The images processed by the conventional color display device using the spokes in a color wheel can occasionally have distorted colors as well as a color imbalance.

SUMMARY OF THE INVENTION

The present general inventive concept provides a color-spoke-processing apparatus and method usable with sequential color display devices capable of providing improved image signals by using spoke areas according to a color saturation of an input color signal and by controlling an amount by which a luminance of the input color signal is increased by the spoke areas according to a luminance of the input color signal.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a spoke-processing apparatus usable with sequential color display devices, comprising a saturation calculation unit to calculate a color saturation of an input color signal and to determine whether the calculated color saturation is less than or equal to a first threshold, a luminance calculation unit to determine whether the input color signal has a luminance that is greater than a second threshold when the calculated color saturation is determined by the saturation calculation unit to be less than or equal to the first threshold, a signal intensifying/lessening ratio calculation unit to determine whether to increase the luminance of the input color signal using spoke areas according to the determination of the luminance calculation unit, and to calculate a signal adjustment ratio to intensify or lessen the input color signal based on whether the luminance of the input color signal is increased by the spoke areas, and a spoke application unit to output an output color signal having luminances of respective color components intensified or lessened according to the calculated signal adjustment ratio.

The spoke-processing apparatus may further comprise a spoke application unit to select one or more spoke areas to be used from among a plurality of spoke areas created by one of neighboring color segments of a color wheel and a switching time of an n-channel sequential color display.

The saturation calculation unit can calculate the color saturation based on the equation below:

if $max1$ is equal to 0, the color saturation $sat = 0$, and if $max1$ is not equal to 0, $$\text{color saturation } sat = \frac{max1 - min1}{max1},$$

where max1 represents a maximum value function of the input color signal, and min1 represents a minimum value function of the input color signal.

The signal intensifying/lessening ratio calculation unit can calculate the signal adjustment ratio based on the equation below:

if $Y<yth$, $sp\_fac=G_{sat}\times Y$, if $Y\geq yth$, $sp\_fac=G_{sat}\times Y-1$, where sp_fac represents the signal adjustment ratio of the input color signal, Y represents the luminance of the input color signal, $G_{sat}$ represents a gain of the color saturation, and yth represents the second threshold.

The gain $G_{sat}$ of the color saturation can be calculated by the equation below:

if $sat > sth2$, $G_{sat} = f(sat) = 0$, if $sth1 < sat \leq sth2$, $G_{sat} = f(sat) = \frac{sth2 - sat}{sth2 - sth1}$, and if $sat \leq sth1$, $Gsat = f(sat) = 1$ where $G_{sat}$ represents the gain of the color saturation, sth2 represents the first threshold, and sth1 represents a saturation value as a reference to distinguish a middle color saturation from a low color saturation.

The spoke application unit can calculate the output color signal based on the equation below:

$C1^* = C1 + sp\_fac \times sp1_{gain}$ where C1* represents the output color signal having a luminance intensified or lessened by the spoke application unit according to the signal adjustment ratio, C1 represents the input color signal, $sp1_{gain}$ represents a control gain of the input color signal, and sp_fac represents the signal adjustment ratio calculated by the signal intensifying/lessening ratio calculation unit.

The foregoing and/or other aspects of the present general inventive concept are also achieved by providing a spoke-processing method usable in sequential color display devices, comprising calculating a color saturation of an input color signal and determining whether the calculated color saturation is less than or equal to a first threshold, determining whether the input color signal has a luminance that is greater than a second threshold when the calculated color saturation is determined to be less than or equal to the first threshold, determining whether to increase the luminance of the input color signal using spoke areas when the luminance of the color input signal is greater than the second threshold and the calculated color saturation is less than or equal to the first threshold and calculating a signal adjustment ratio to intensify or to lessen the input color signal based on whether the luminance of the input color signal is increased by the spoke areas, and outputting an output color signal having luminances of respective color components intensified or lessened according to the calculated signal adjustment ratio.

The spoke-processing method may further comprise selecting one or more spoke areas to be used from among a plurality of spoke areas created by one of neighboring color segments of a color wheel and a switching time of an n-channel sequential color display.

The color saturation can be calculated based on the equation below:

if $max1$ is equal to 0, the color saturation $sat = 0$, and if $max1$ is not equal to 0, $$\text{color saturation } sat = \frac{max1 - min1}{max1},$$

where max1 represents a maximum value function of the input color signal, and min1 represents a minimum value function of the input color signal.

The signal adjustment ratio can be calculated based on the equation below:

if $Y<yth$, $sp\_fac=G_{sat}\times Y$, if $Y\geq yth$, $sp\_fac=G_{sat}\times Y-1$, where sp_fac represents the signal adjustment ratio of the input color signal, Y represents the luminance of the input color signal, $G_{sat}$ represents a gain of the color saturation, and yth represents the second threshold.

The gain $G_{sat}$ of the color saturation can be calculated by the equation below:

if $sat > sth2$, $G_{sat} = f(sat) = 0$, if $sth1 < sat \leq sth2$, $G_{sat} = f(sat) = \frac{sth2 - sat}{sth2 - sth1}$, and if $sat \leq sth1$, $Gsat = f(sat) = 1$ where $G_{sat}$ represents the gain of the color saturation, sth2 represents the first threshold, and sth1 represents a saturation value as a reference to distinguish a middle color saturation from a low color saturation.

The output color signal can be calculated based on the equation below:

$C1^* = C1 + sp\_fac \times sp1_{gain}$ where C1* represents the output color signal having a luminance that is intensified or lessened according to the signal adjustment ratio, C1 represents the input color signal, $sp1_{gain}$ represents a control gain of the input color signal, and sp_fac represents the signal adjustment ratio.

If the color saturation of the input color signal is larger than the first threshold, the spoke areas are not used to increase the luminance of the input color signal.

Further, if the luminance of the input color signal is larger than the second threshold, the spoke areas are used to increase the luminance of the input color signal. One the other hand, if the luminance is less than the second threshold, the spoke areas are not used to increase the luminance of the input color signal. If the luminance of the input color signal is greater than the second threshold, the luminance of the input color signal is increased by the spoke areas and decreased to a first desired luminance according to the signal adjustment ratio, and if the luminance of the input color signal is less than the second threshold, the luminance of the input color signal is increased to a second desired luminance according to the signal adjustment ratio.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
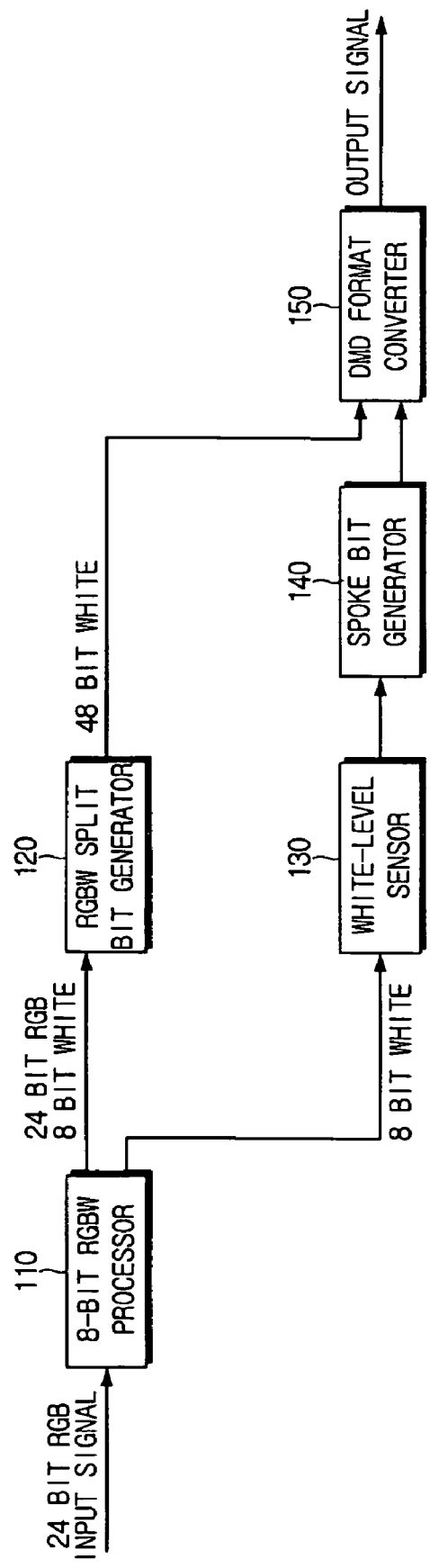
FIG. 1A is a block diagram illustrating a conventional color display device using spokes.
Figure 1B:
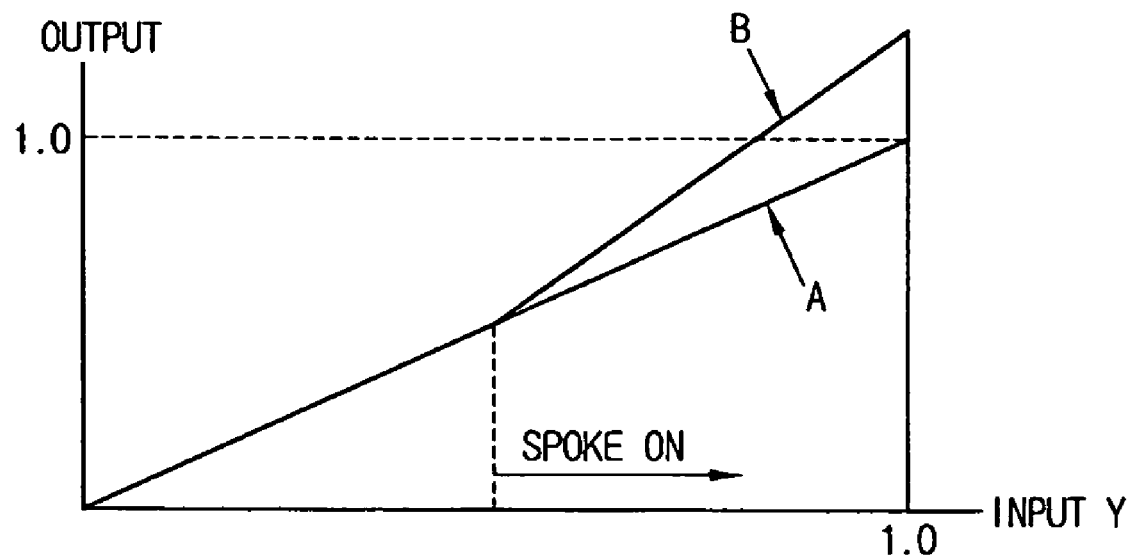
FIG. 1B is a view illustrating a comparison between luminance of output images when spoke areas are used and when the spoke areas are not used.

Reference will now be made in detail to the embodiments of the present general inventive concept, examples of which are illustrated in the accompanying drawings, wherein like reference numerals refer to the like elements throughout; The embodiments are described below in order to explain the present general inventive concept while referring to the figures.

Figure 2A:
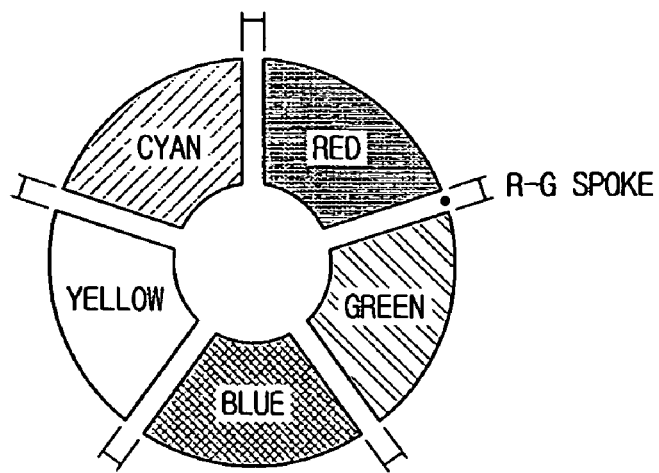
FIGS. 2A and 2B are views illustrating spoke areas in a multi-colored display according to an embodiment of the present general inventive concept.
Figure 2B:
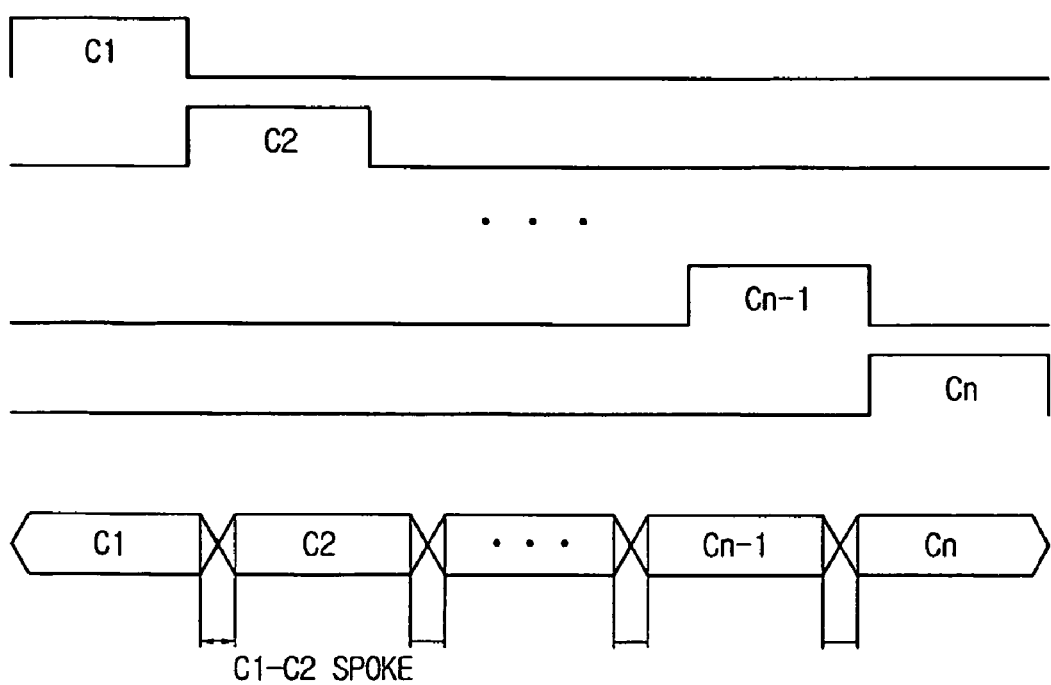

FIGS. 2A and 2B are views illustrating spoke areas in a multi-colored display according to an embodiment of the present general inventive concept.

FIG. 2A is a view illustrating a five-color wheel of RYGCB used in a five-channel multiprimary display (MPD), which is a color wheel-driven display system. As illustrated in FIG. 2A, the color wheel includes the spoke areas in between boundaries of neighboring color segments where the neighboring colors are mixed due to a size of beams. Thus, some conventional color wheel-driven display systems do not use the spoke areas of the color wheel in order to maintain color purity of images. However, the present general inventive concept uses the spoke areas depending on a color saturation and a luminance of a color signal. A color wheel typically includes a disc-shaped assembly of dichroic filters as illustrated in FIG. 2A. White beams converge on the dichroic filters of the color wheel. A portion of the white beams pass through, and a portion of the white beams are reflected from the color wheel according to the dichroic filters that the white beams are incident on. Accordingly, a primary color beam can be formed. The color wheel includes at least one filter for each of the primary colors. When the color wheel is rotated, it produces a series of primary color beams. Additionally, the color wheel can be rotated fast enough to produce each primary color within a corresponding region of each image frame.

FIG. 2B is a view illustrating a sequential color signal in an n-channel sequential color display system. As illustrated in FIG. 2B, spoke areas can also occur in the n-channel sequential color display system that uses lasers or light-emitting diodes (instead of white beams and a color wheel as a light source), since colors can be mixed due to an effect of switching speeds, or the like, of each color.

Therefore, the present general inventive concept can be applied to either the color wheel-driven display system of FIG. 2A or the n-channel sequential color display system of FIG. 2B, since the present general inventive concept can use both the spoke areas of the color wheel and the spoke areas caused by sequential color signals to improve a luminance of a color signal.

Hereinafter, the present general inventive concept will be described with reference to a five-color wheel, in which a source device is a three-channel sRGB system and a target device is a five-channel RYGCB system. However, it should be understood that other source devices and target devices may alternatively be used with the present general inventive concept. The color wheel illustrated in FIG. 2A has five primary colors including red, green, blue, yellow, and cyan, which are used for the 5-channel MPD. Further, the color wheel has five spoke areas including red-green (R-G), green-blue (G-B), blue-yellow (B-Y), yellow-cyan (Y-C), and cyan-red (C-R). A mixture of all the spoke areas produces a white color, since the five spoke areas are areas including mixed neighboring colors.

Figure 3A:
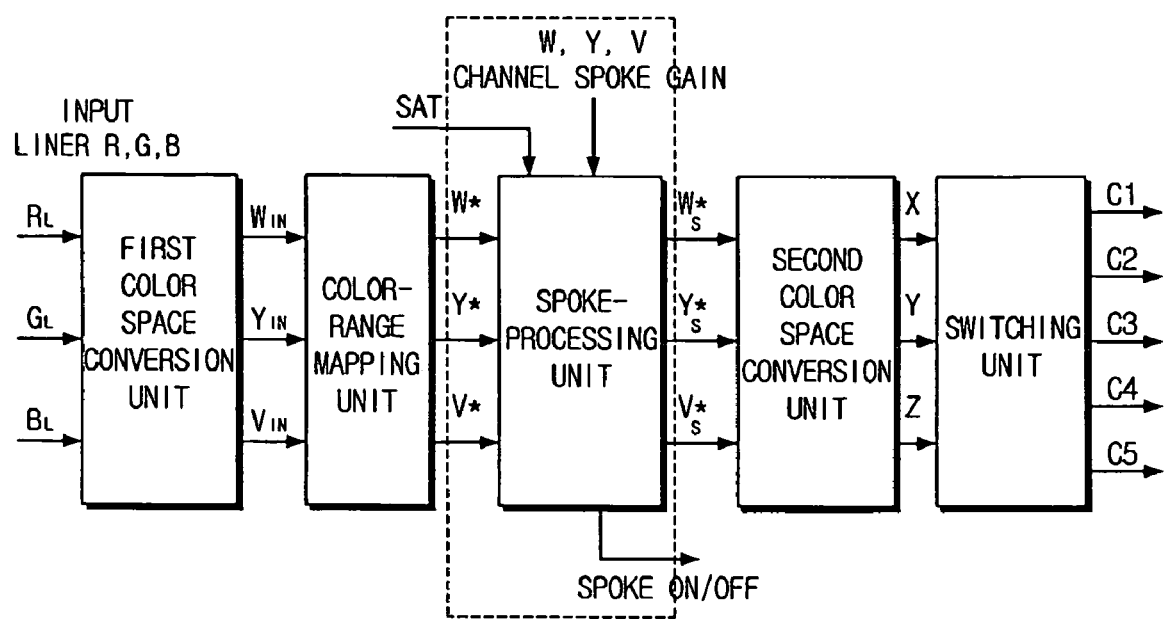
FIGS. 3A and 3B are views illustrating a spoke-processing apparatus usable with a color display device according to embodiments of the present general inventive concept.
Figure 3B:
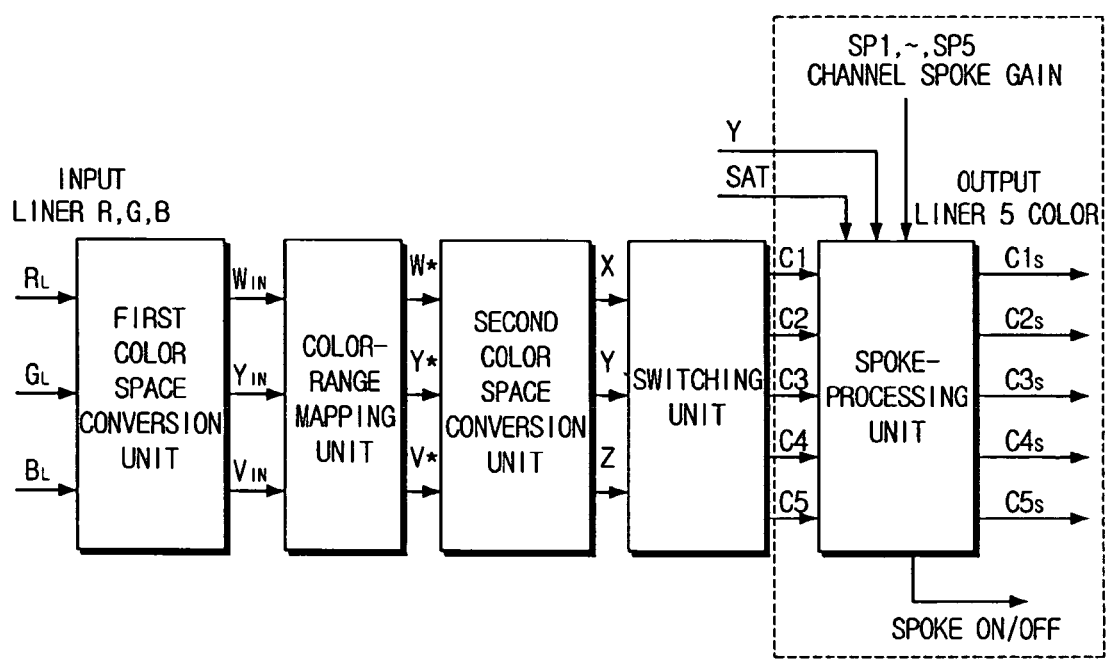

FIGS. 3A and 3B are views illustrating a spoke-processing apparatus according to various embodiments of the present general inventive concept usable with a color display device. The spoke processing apparatuses of FIGS. 3A and 3B include a first color space conversion unit, a color range mapping unit, a spoke processing unit, a second color space conversion unit, and a switching unit.

FIG. 3A illustrates the spoke processing apparatus according to an embodiment of the present general inventive concept. The spoke areas are used by a spoke processing unit after a color range mapping unit color maps the source device (i.e., the three channel sRGB system) to the target device (i.e., the five-channel RYGCB system). As illustrated in FIG. 3A the spoke-processing unit utilizes the spoke areas for an output signal in a WYV signal-processing process after the color range mapping unit maps the three channel sRGB system to the five-channel RYGCB system. The spoke processing can be performed in a WYV color space. Alternatively, the spoke-processing unit can be located between the second color space-converting unit and the switching unit to perform the spoke processing in a linear color space such as an XYZ color space.

FIG. 3B is a view illustrating the spoke processing apparatus according to another embodiment of the present general inventive concept. The spoke processing apparatus of FIG. 3B uses the spoke areas to increase a luminance of an output signal according to a control signal of each color component before a display is driven. That is, FIG. 3B illustrates that the spoke processing (i.e., performed by the spoke processing unit) is performed according to the control signal output from the switching unit.

Figure 4:
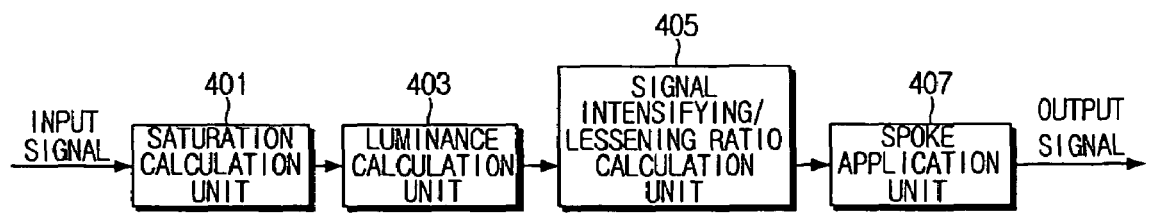
FIG. 4 is a block diagram illustrating a color spoke-processing apparatus usable with sequential color display devices according to an embodiment of the present general inventive concept.

FIG. 4 is a block diagram illustrating a color spoke-processing apparatus usable with sequential display devices according to an embodiment of the present general inventive concept. The color-spoke processing apparatus of FIG. 4 may be used as the spoke processing unit of FIGS. 3A and 3B.

As illustrated in FIG. 4, the color spoke-processing apparatus usable with sequential color display devices includes a saturation calculation unit 401, a luminance calculation unit 403, a signal intensifying/lessening ratio calculation unit 405, and a spoke application unit 407.

As illustrated in FIG. 4, the saturation calculation unit 401 calculates saturations of R, G, and B color signals. The calculated saturations are used to identify highly saturated regions having a color saturation that is higher than a first threshold sth2 in order to avoid using the spoke areas to intensify luminance in the identified regions. More specifically, the increase in the luminance produced by using the spoke areas is not applied to pure R, G, and B colors of the highly saturated regions at a boundary of a color range (i.e., a color gamut) in an input color signal, because using the spoke areas to intensify the input color signal may move the input color signal outside the color range.

The luminance calculation unit 403 calculates a luminance of the input color signal to be intensified or lessened using the spoke areas in spoke application regions having a color saturation value that is less than or equal to the first threshold value sth2. Thus, when the color saturation is determined to be less than or equal to the first threshold value sth2, the calculated luminance is compared to a third threshold value yth to determine whether the luminance should be intensified using the spoke areas. The luminance of the input color signal in the regions where the luminance value is higher than the third threshold value yth is increased using the spoke areas, whereas the luminance of the input color signal in the regions where the luminance value is less than the third threshold value yth is not increased using the spoke areas. Accordingly, unnecessary increases in the luminance in low-luminance regions can be prevented and an increase of luminance in high-luminance regions can be provided.

The signal intensifying/lessening ratio calculation unit 405 calculates a signal adjustment ratio to intensify or lessen the input color signal depending on whether the luminance is increased using the spoke areas. The signal adjustment ratio controls an amount of input color signal such that luminance thereof can be adjusted, and changes in luminance that result from using the spoke areas or from not using the spoke areas can be made to appear gradual. One or more spoke areas to be used to increase the luminance of the input color signal can be selected from among all of the spoke areas of the color wheel Thus, the one or more spoke areas in conjunction with the signal adjustment ratio calculated by the signal intensifying/lessening ratio calculation unit 405 can control (and limit) the luminance increase and a color temperature to a desired extent.

When a luminance value of the input color signal is higher than the third threshold value yth and the spoke areas are used to increase the luminance of the input color signal, an output luminance is abruptly changed due to the use of the spoke areas, since the spoke areas increase the luminance of the input color signal by a fixed amount. In order to control the abrupt changes in luminance caused by using the spoke areas, the luminance of the input color signal can be lessened by applying the signal adjustment ratio to the input color signal when the luminance of the input color signal is increased using the spoke areas. Conversely, when the spoke areas are not used to increase the luminance of the input color signal, the signal adjustment ratio can be applied to intensify the input color signal, thereby increasing the luminance. Therefore, the signal intensifying/lessening ratio calculation unit 405 calculates the signal adjustment ratio to be applied to the input color signal according to whether the luminance value of the input signal exceeds the third threshold.

The spoke application unit 407 applies the signal adjustment ratio calculated by the signal intensifying/lessening ratio calculation unit 405 to the input color signal to lessen the luminance of the output signal obtained by using the spoke areas or to increase the luminance of the output signal with respect to the input signal having low-luminance regions in which the luminance is not increased using the spoke areas, respectively.

Figure 5:
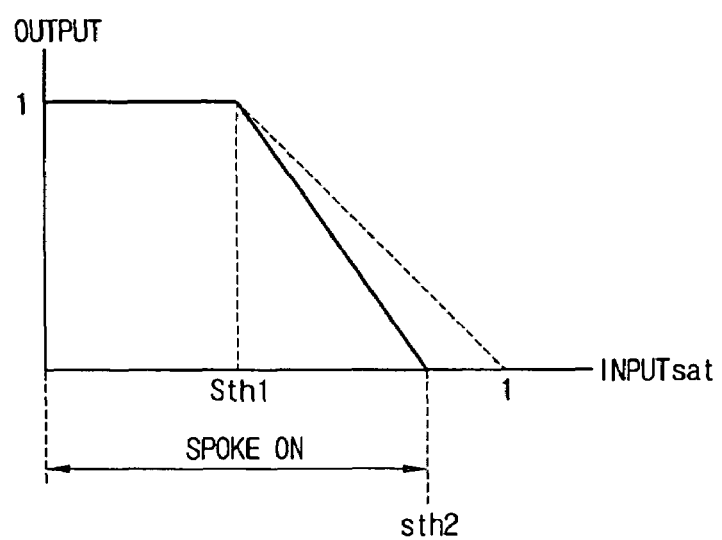
FIG. 5 is a view illustrating operations of a saturation calculation unit of the color spoke-processing apparatus of FIG. 4.

FIG. 5 is a view illustrating operations of the saturation calculation unit 401 of the color spoke processing apparatus of FIG. 4.

As illustrated in FIG. 5, a region in which a color saturation of an input color signal has a value that is less than or equal to a second threshold value sth1 is referred to as a low saturation region, a region of in which a color saturation of the input color signal has a value greater than the second threshold value sth1 and less than or equal to the first threshold value sth2 is referred to as a middle saturation region, and a region in which a color saturation of the input color signal has a value greater than the first threshold value sth2 is referred to as a high saturation region. If the color saturation of the input color signal has a value greater than the first threshold value sth2 in a certain first region, the luminance of the input color signal is not intensified in the certain first region using the spoke areas. On the other hand, if the color saturation of the input color signal has a value that is less than or equal to the first threshold value sth2 in a certain second region, the luminance of the input color signal is intensified using the spoke areas in the certain second region. However, in the certain second region of the input color signal having the color saturation that is less than or equal to the first threshold value sth2, the luminance of the input color signal is increased by the spoke areas by differing amounts according to a comparison of a second threshold value sth1 and the color saturation of the input color signal.

The equation below is used to calculate the color saturation of the input color signal:

$$\text{if } max1 = 0, \text{ then } sat(\text{saturation}) = 0, \text{ and} \qquad \text{[Equation 1]}$$

if $max1$ is not equal to 0,

-continued $$sat = \frac{max1 - min1}{max1}$$

where max1 refers to max(R,G,B) representing a maximum value function of an RGB signal (i.e., the input color signal) and min1 refers to min(R,G,B), representing a minimum value function of the RGB signal.

The equation below is used to calculate a color-saturation gain using the saturation value obtained from Equation 1 above:

$$G_{sat} = f(sat) = 0, sat > sth2_{(spoke\ off)}$$ [Equation 2]

$$G_{sat} = f(sat) = \frac{sth2 - sat}{sth2 - sth1}$$ [Equation 3]

$$sth1 < sat \leq sth2_{(spoke\ on)}$$

$$Gsat = f(sat) = 1, sat \leq sth1_{(spoke\ on)}$$ [Equation 4]

where sth2 denotes the first threshold value that corresponds to the color saturation as a reference to whether the luminance of the input color signal is intensified using the spoke areas, and sth1 denotes the second threshold value that corresponds to the color saturation as a reference used to distinguish the input color signal in the middle saturation region from the low saturation region. Further, $G_{sat}$ denotes a gain of the color saturation.

The region of sat>sth2 denotes the high-saturation region in which the color saturation gain becomes 0, and the region of sat≦sth1 denotes the low-saturation region in which the color saturation gain becomes 1. The region of sth1<sat≦sth2 denotes the middle-saturation region in which the color saturation gain can be calculated according to Equation 3.

Figure 6:
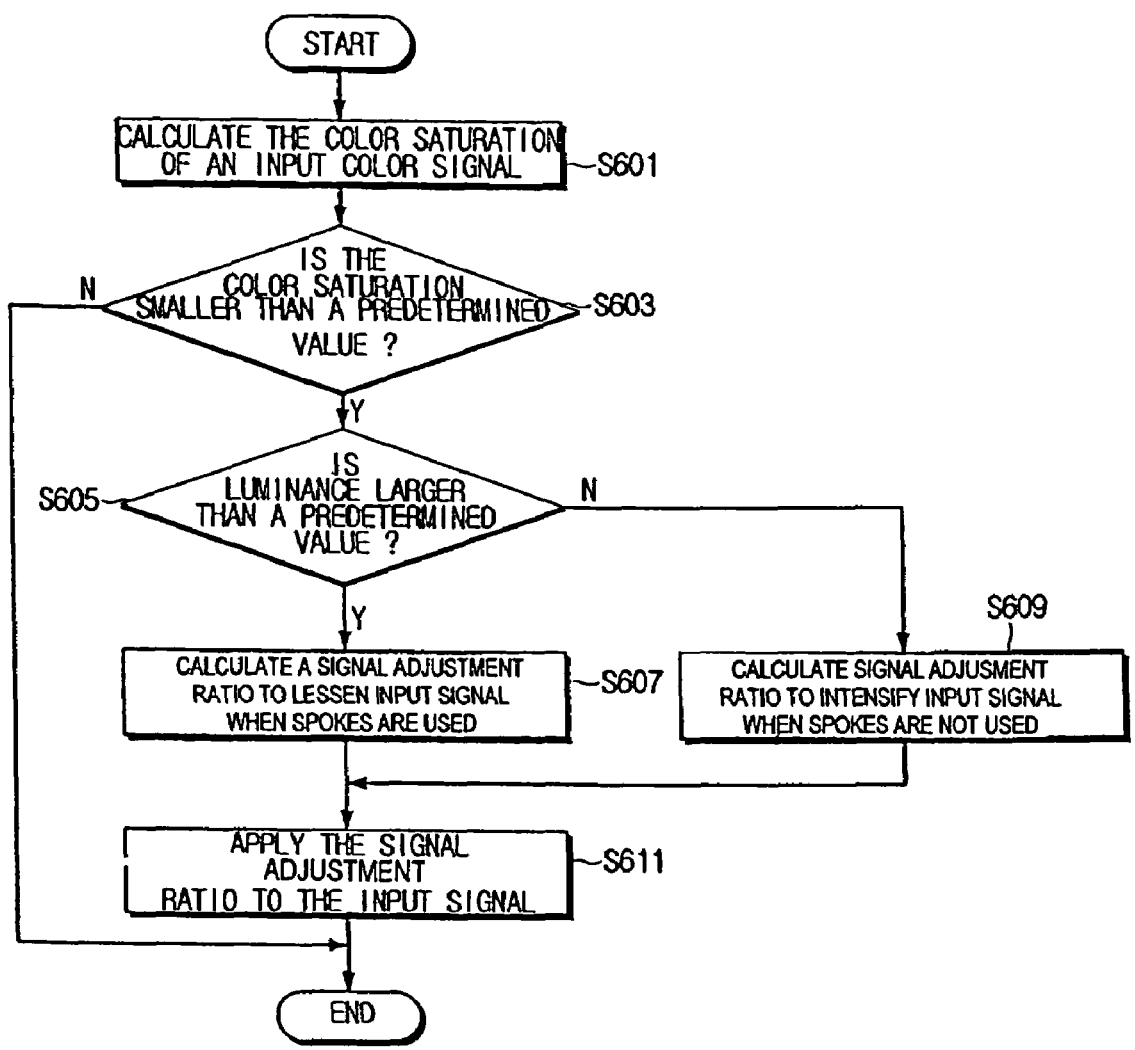
FIG. 6 is a flow chart illustrating a method of processing color spokes in sequential color display devices according to an embodiment of the present general inventive concept.

FIG. 6 is a flow chart illustrating a method of processing a color spoke in sequential color display devices according to an embodiment of the present general inventive concept.

As illustrated in FIG. 6, the saturation calculation unit 401 calculates the color saturation of an input color signal (operation S601), which is used to determine whether the spoke areas are used to increase the luminance of the input color signal. When the calculated color saturation of the input color signal is determined to be in the high-saturation region (operation 603), it is determined that the spoke areas are not used to increase the luminance, since the input color signal in the high-saturation region has highly saturated colors and needs no increase in luminance. When the calculated color saturation of the input color signal is determined to be in the middle-saturation region or the low-saturation region, the spoke areas are used to intensify the luminance by different amounts depending on whether the color saturation of the input color signal is in the middle-saturation region or in the low-saturation region.

Next, the saturation calculation unit 401 determines whether the calculated color saturation of the input color signal is greater than the first threshold value sth2 (operation. S603). If the color saturation of the input color signal is greater than the first threshold value sth2, it is determined that the spoke areas are not used to increase the luminance of the input color signal, since the colors of the input color signal are already highly saturated and luminance intensification using the spoke areas can cause the colors of the input color signal to be outside the color range (i.e., having a luminance that is higher than the first threshold value sth2 in a pure RGB region). Since the spoke areas are used to increase the luminance by a fixed amount, the input color signal can be driven out of the color range by the luminance intensification. In the low-saturation region, the use of the spoke areas increases the luminance by a higher amount compared to a magnitude of luminance increase in the middle-saturation region.

Further, the luminance calculation unit 403 determines whether the luminance of the input color signal is greater than the third threshold value yth, when the color saturation of the input color signal is determined to be less than or equal to the first threshold value sth2 (i.e., in the low saturation region or the middle saturation region) (operation S605). When the luminance calculation unit 403 determines that the luminance of the input color signal is greater than a predetermined value (i.e., the third threshold yth), the luminance of the input color signal can be adjusted by applying a signal adjustment ratio. In other words, since the one or more spoke areas only provide a fixed amount of luminance when turned on, an abrupt change in the luminance of the input color signal occurs. Thus, the various embodiments of the present general inventive concept, and in particular, the method of FIG. 6, provide the signal adjustment ratio that allows the luminance of the input color signal to be adjusted by intensifying or lessening an amount of input color signal used.

The spoke areas are used to increase the luminance of the input color signal when the input color signal has a color saturation value that is less than the first threshold value sth2 and a luminance value that is greater than the third threshold value yth. However, in order to prevent an output signal from being abruptly changed due to the increase in luminance, a calculation is performed to obtain the signal adjustment ratio by which the input color signal is to be lessened (operation S607). The adjustment of the amount of the input color signal adjusts the luminance, thereby decreasing the effect of the abrupt change in the luminance. When the input color signal is determined to be in the middle-saturation region (i.e., having a color saturation value that is less than the first threshold value sth2 and greater than the second threshold value sth1), the luminance is increased less by the spoke areas as compared to when the color saturation of the input color signal is in the low-saturation region (i.e., is less than or equal to the second threshold value sth1). In order to prevent the output signal from being abruptly changed due to the increase in luminance provided by the spoke areas, the luminance can be adjusted (i.e., lessened) by applying the signal adjustment ratio to lessen the amount of the input color signal when the color saturation is in the middle-saturation region or in the low-saturation region. Since the spoke areas provide a different increase in luminance in the input color signal in the low-saturation region than in the middle-saturation region, the signal adjustment ratios used to lessen the amount of input color signal in each region also vary.

However, the spoke areas are not used to intensify the luminance when the input color signal has a color saturation value that is less than the first threshold value sth2 and a luminance value that is less than the third threshold value yth. Thus, in order to prevent luminance of the output signal from abruptly changing due to the non-increase of the luminance of the input color signal, a calculation is performed to obtain the signal adjustment ratio by which the input color signal is to be intensified (operation S609). When the input color signal is intensified by the signal adjustment ratio, the luminance is effectively increased. This adjustment of the low-luminance portion of the input color signal is performed such that a difference in luminance between the low luminance portion of the input color signal that is not increased by the spoke areas and between other portions of the input color signal that are increased by the spoke areas is gradual. The signal adjustment ratio is calculated by the signal intensifying/lessening ratio calculation unit 405.

The signal adjustment ratio calculated as above is applied to intensify or lessen the luminance of the input color signal (operation S611).

Further, each spoke area is controlled to be used or not to be used such that only necessary spoke areas can be used and the color temperature can be controlled.

Figure 7A:
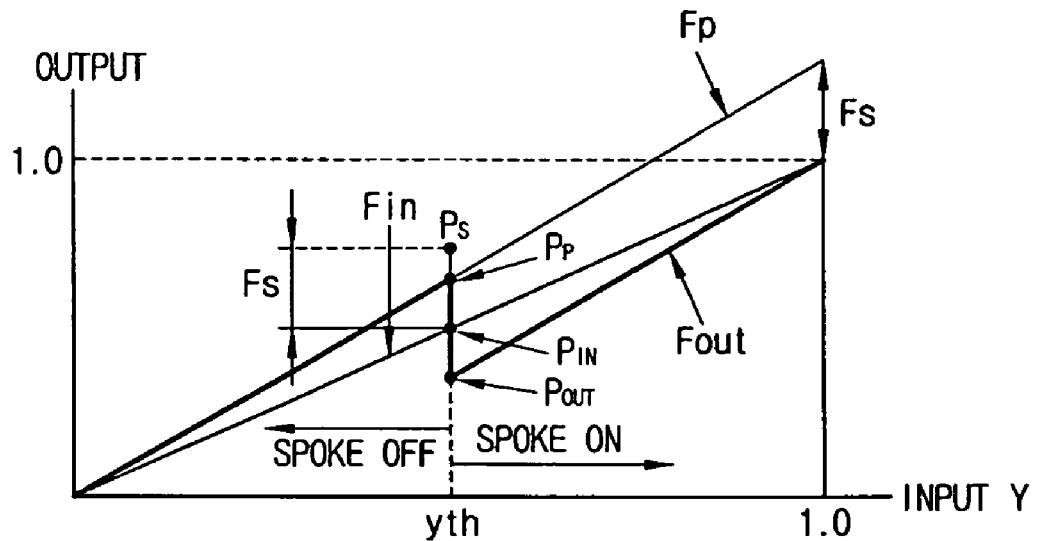
FIGS. 7A to 7C are views illustrating output signals to which a signal adjustment ratio is applied based on a luminance calculated by a luminance calculation unit of the color-spoke processing apparatus of FIG. 4.
Figure 7B:
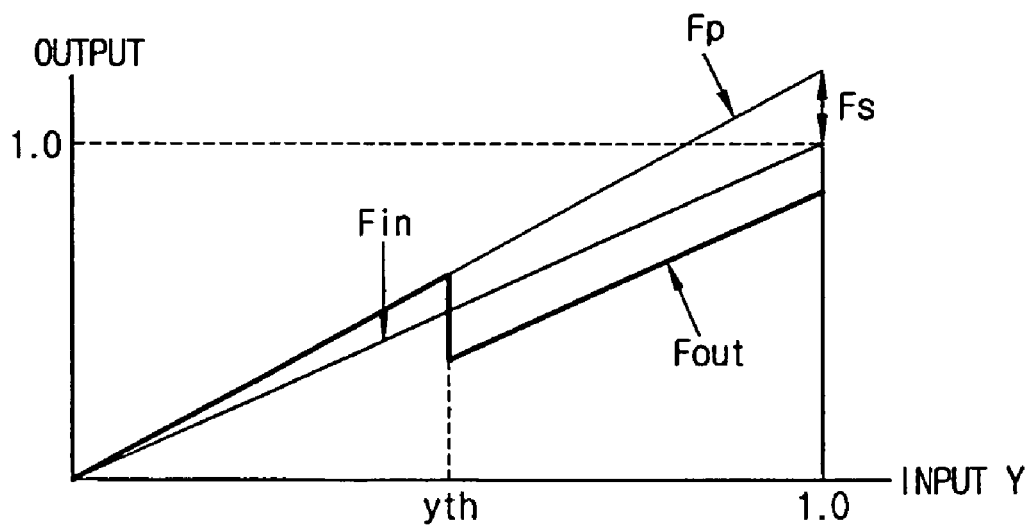
Figure 7C:
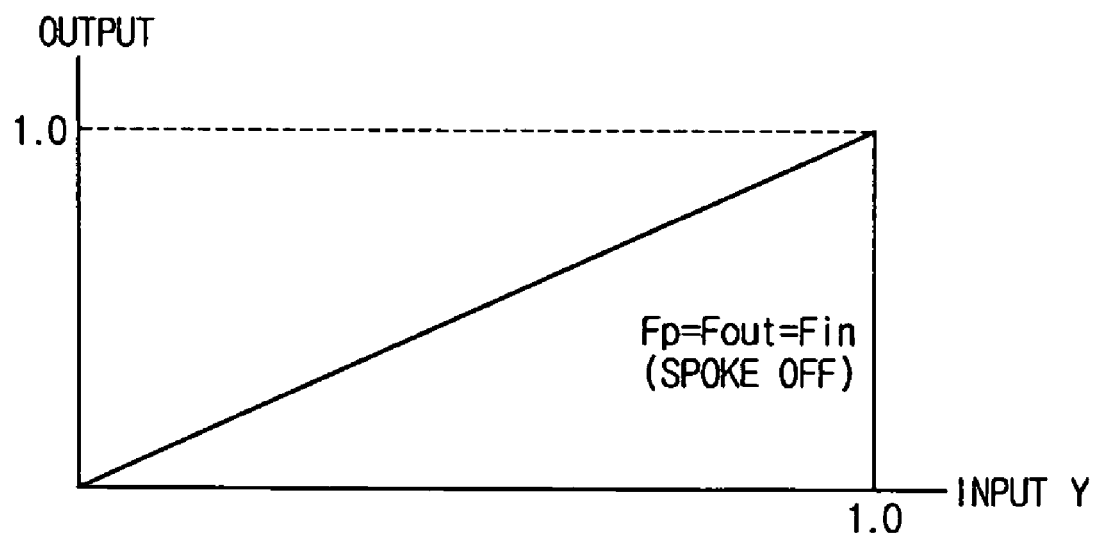

FIG. 7A to 7C are views illustrating output signals to which a signal adjustment ratio is applied to intensify or lessen an input color signal based on the luminance calculated by the luminance calculation unit 403.

FIG. 7A illustrates the intensification or lessening of an input color signal having a color saturation in the low-saturation region, FIG. 7B illustrates the intensification or lessening of input color signal having a color saturation in the middle-saturation region, and FIG. 7C illustrates the intensification or lessening of an input color signal having a color saturation in the high-saturation region. In FIGS. 7A through 7C, Fin represents an input color signal, Fp represents a desired output signal, Fout represents an actual output signal, yth represents the third threshold value as a luminance threshold value, and Fs represents a predetermined amount of the luminance by which the luminance of the input color signal Fin is increased when the spoke areas are used (i.e., turned on). Further, Pin represents an input color signal point corresponding to the third threshold value yth, Ps represents an output signal point when there is no signal adjustment (by a signal adjustment ratio) when the spoke areas are used to increase luminance of the input color signal Fin, Pp represents a point adjusted to match the desired output signal Fp to move up to the output point Ps, and Pout represents a point to be adjusted when Pin is adjusted by an amount given by (Ps-Pp).

The signal adjustment ratio used to intensify or lessen the amount of the input color signal Fin in order to increase or decrease the luminance of the input color signal Fin can be obtained in the equation as below.

$$sp\_fac = G_{sat} \times Y, Y < yth_{(spoke\ off)}$$

$$sp\_fac = G_{sat} \times Y - 1, Y \geq yth_{(spoke\ on)}$$ [Equation 5]

where Y represents luminance of the input color signal Fin, sp_fac represents a signal adjustment ratio by which the input color signal Fin is be intensified to or lessened (i.e., adjusted), $G_{sat}$ obtainable using Equations 3, 4, and 5 represents a saturation gain, and yth represents the third threshold value as a luminance threshold value.

FIG. 7A illustrates the actual output signal Fout to which the signal adjustment ratio sp_fac is applied in the low-saturation region, in which the predetermined amount of luminance Fs by which the luminance Y of the input color signal Fin is increased when the spoke areas are used is larger when compared to the middle-saturation region or the high-saturation region. This is because a value of $G_{sat}$ obtained in Equation 4 used in Equation 5 is larger compared to a value of $G_{sat}$ obtained in Equation 3 that corresponds to the middle-saturation region or a value of $G_{sat}$ obtained in Equation 2 that corresponds to the high-saturation region.

FIG. 7B illustrates the actual output signal Fout to which the signal adjustment ratio sp_fac is applied in the middle-saturation region, in which the predetermined amount of luminance Fs by which the luminance Y of the input color signal Fin is increased less when compared to the predetermined amount of luminance Fs by which the luminance Y of the input color signal Fin is increased in the low-saturation region (see FIG. 7A) when the spoke areas are used. This is because the value of $G_{sat}$ obtained in Equation 3 is less than $G_{sat}$ in the low-saturation region.

FIG. 7C illustrates the actual output signal to which the signal adjustment ratio sp_fac is applied in the high-saturation region, in which the spoke areas are not used to increase the luminance Y of the input color signal Fin. As obtained in Equation 2, since $G_{sat}$ is zero, the luminance Y of the input color signal Fin is increased by an amount of zero when the spoke areas are used. Therefore, the input color signal Fin, the desired output signal Fp, and the actual output signal Fout are all the same.

Additionally, the luminance value Y that is increased when the spoke areas are used varies depending on a color saturation value $G_{sat}$ of the input color signal Fin that is calculated by the saturation calculation unit 401 (see FIG. 4). Further, the signal adjustment ratio sp_fac by which the input color signal is intensified or lessened varies in each saturation region and with respect to the third threshold value yth. When the luminance value Y of the input color signal Fin is larger than the third threshold value yth, the predetermined amount of luminance Fs by which the luminance Y of the input color signal Fin is increased by the spoke areas is not changeable. In other words, the spoke areas increase the luminance Y by a fixed amount. Therefore, in order to control abrupt changes of the actual output signal Fout that occur due to the luminance increase according to the use of spoke areas, the signal adjustment ratio sp_fac is used to intensify or to lessen an amount of the input color signal Fin in each saturation region is varied with reference to the third threshold value yth. Accordingly, the luminance Y of the input color signal Fin that is increased by the use of spoke areas is also lessened by adjusting the input color signal Fin according to the signal adjustment ratio sp_fac, while the luminance Y of the input color signal Fin that is not increased by the spoke areas is increased by applying the signal adjustment ratio sp_fac to the input color signal Fin.

The signal adjustment ratio sp_fac by which the input color signal Fin is intensified or lessened will now be described with reference to the low-saturation region of FIG. 7A.

As illustrated in FIG. 7A, the input color signal Fin having a luminance Pin corresponding to the third threshold value yth is equal to Ps when there is no signal adjustment and the spoke areas are used. However, when the spoke areas increase the luminance of the input color signal Fin, a corresponding output signal includes the point Ps at the third threshold yth, and the corresponding output signal is abruptly changed compared to an input color signal Fin in the low-saturation region (i.e., having a color saturation that is less than the second threshold value sth1) having a luminance that is not increased by the spoke areas. In other words, an output image signal becomes discontinuous in the low-saturation region when the spoke areas are used to increase the luminance of the input color signal Fin if the intensity of the input color signal Fin is not lessened by the signal adjustment ratio. Therefore, when the input color signal Fin is adjusted to move Ps to match the line Fp that represents the desired output signal, Ps is adjusted to the point of Pp. If Pin is adjusted by an amount of (Ps-Pp) as described above, Pin is adjusted to the point of Pout. Therefore, the output signal that is adjusted to the point Pout forms a line that is parallel with the desired output signal Fp having a difference of Fs from the desired output signal Fp. On the other hand, in the input color signal Fin having a luminance that is less than the third threshold value yth, in which the spoke areas are not used to increase, the luminance of the input color signal Fin is adjusted to the desired output signal Fp. As a result, the corresponding output signal after signal adjustment according to the signal adjustment ratio sp_fac becomes an actual output signal Fout instead of the desired output signal Fp.

Figure 8A:
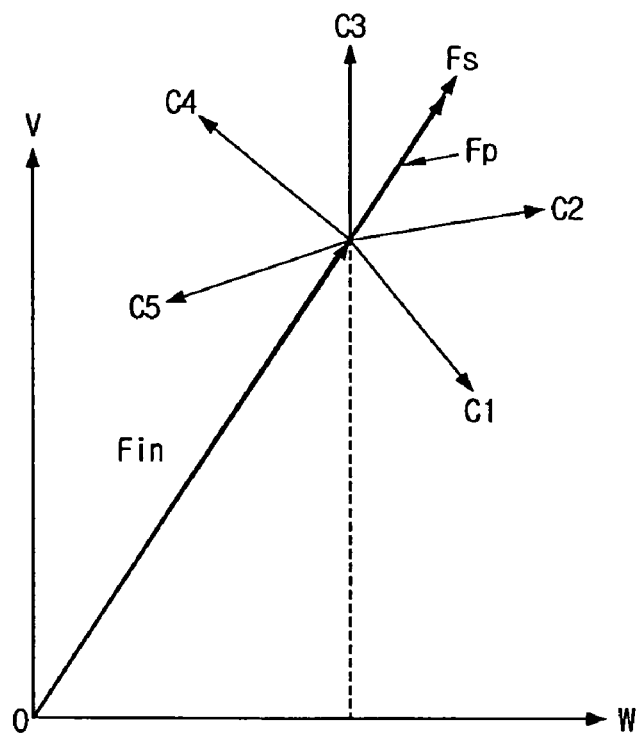
FIGS. 8A and 8B are views illustrating output signals having luminance levels that are intensified using spoke areas.
Figure 8B:
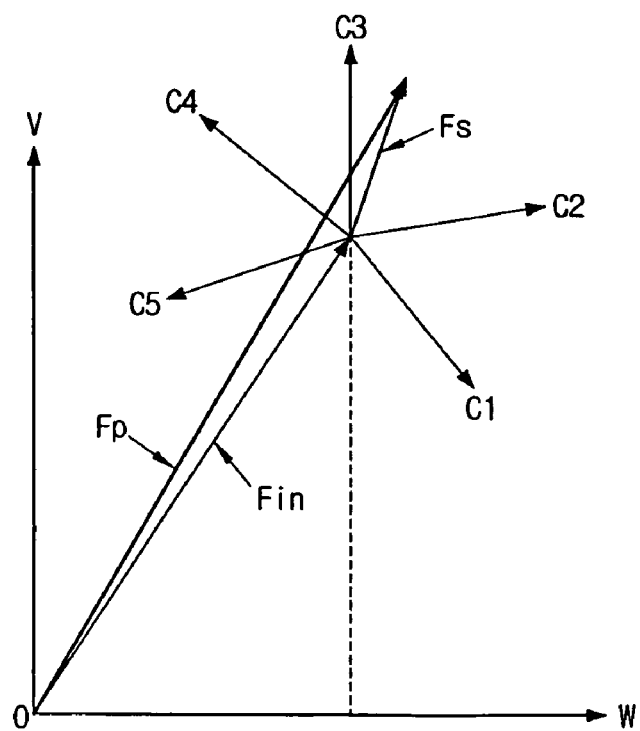

FIGS. 8A and 8B are views illustrating an output signal according to the signal adjustment ratio used to intensify or lessen the input color signal when the spoke areas are used to increase the luminance of the input color signal.

FIGS. 8A and 8B illustrate that, before a display is applied, the spoke areas are used to increase the luminance of each color component. FIG. 8A illustrates that the spoke areas are used to increase the luminance of all the five color components, and FIG. 8B illustrates that the spoke areas are used to increase the luminance of three of the five color components.

The signal adjustment ratio (sp-fac) used to lessen or intensify the input color signal obtained by using the spoke areas is added to each component of the input color signal based on a spoke control gain, that is, based on a gain of each W, Y, and V component of the input color signal, for each component of an output color signal W*, Y*, and V*. Even in FIGS. 8A and 8B, the signal adjustment ratio obtained when using the spokes is added to each component of the input color signal based on a gain of each component of the input color signal C1, C2, C3, C4, and C5 signals for each component C1*, C2*, C3*, C4*, and C5* of the output color signal. In order to maintain continuity of a color vector of the output color signal, which is a sum of a color vector of the input color signal and a luminance vector by which the luminance of the input color signal is increased by the spokes, the spoke control gain becomes a scale value in the color space of the color vector of the input color signal.

The components of the output color signal having a luminance that is increased by the spokes can be obtained in Equation 6.

$$W^* = W + sp\_fac \times w_{gain}$$

$$Y^* = Y + sp\_fac \times Y_{gain}$$

$$Z^* = Z + sp\_fac \times v_{gain}$$ [Equation 6]

$$C1^* = C1 + sp\_fac \times sp1_{gain}$$

$$C2^* = C2 + sp\_fac \times sp2_{gain}$$

$$C3^* = C3 + sp\_fac \times sp3_{gain}$$

$$C4^* = C4 + sp\_fac \times sp4_{gain}$$

$$C5^* = C5 + sp\_fac \times sp5_{gain}$$ [Equation 7]

where W*, Y*, and V*, and C1*, C2*, C3*, C4*, and C5* represent the components of the output color signals to which the spoke processing is applied, and W, Y, and V, and C1, C2, C3, C4, and C5 represent the components of the input color signals. Further, $w_{gain}$, $y_{gain}$, and $v_{gain}$ represent corresponding gains of components W, Y, and V, respectively, and $sp1_{gain}$, $sp2_{gain}$, $sp3_{gain}$, $sp4_{gain}$, and $sp5_{gain}$ represent corresponding gains of components C1, C2, C3, C4, and C5. sp_fac represents the signal adjustment ratio used to intensify or lessen the input color signal obtained in the Equations 2, 3, and 4.

Accordingly, a number of spoke areas used in the five-color MPD wheel display can be controlled. Therefore, certain spoke areas out of five spoke areas may be ON, and by using a sum of color obtained from the use of the certain spoke areas and while excluding the use of the other spoke areas, the color temperature of existing white color can be partially changed to a desired white color temperature according to the use of the certain spoke areas. That is, the color temperature can be controlled by selecting the certain spoke areas to be used from among the five spoke areas, and adjusting a white color according to the use of the certain spoke areas. As the sum of the five spoke areas increases the white color, the white color can be obtained by using a selection of three of the five spoke areas. As illustrated in FIG. 8B, if three of the five spoke areas are used and a proper spoke control gain is selected, the amount by which luminance is increased by the spoke areas decreases, but the color temperature can be improved as in the white color tone enhancement effect upon the luminance increase.

Figure 9A:
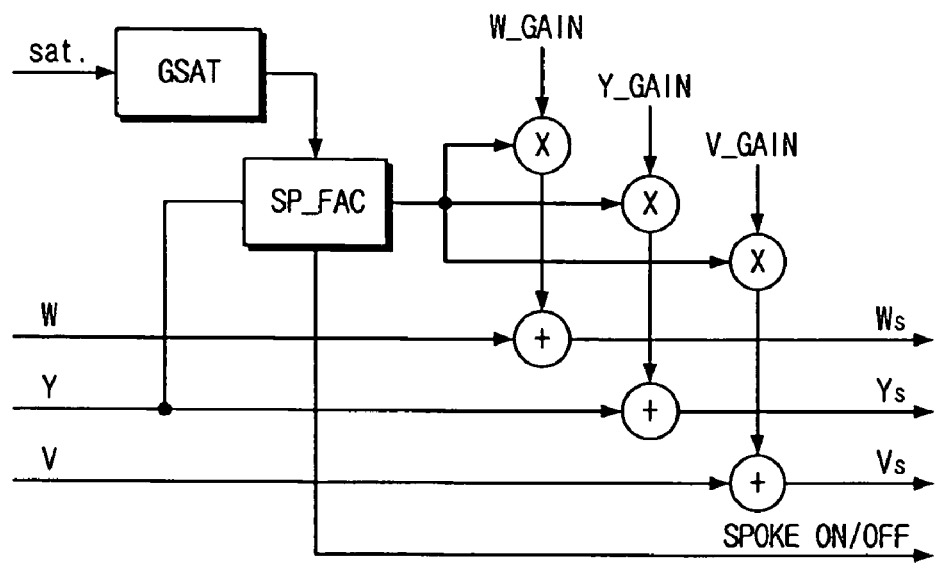
FIGS. 9A and 9B are views illustrating a spoke application unit of the color spoke processing apparatus of FIG. 4.
Figure 9B:
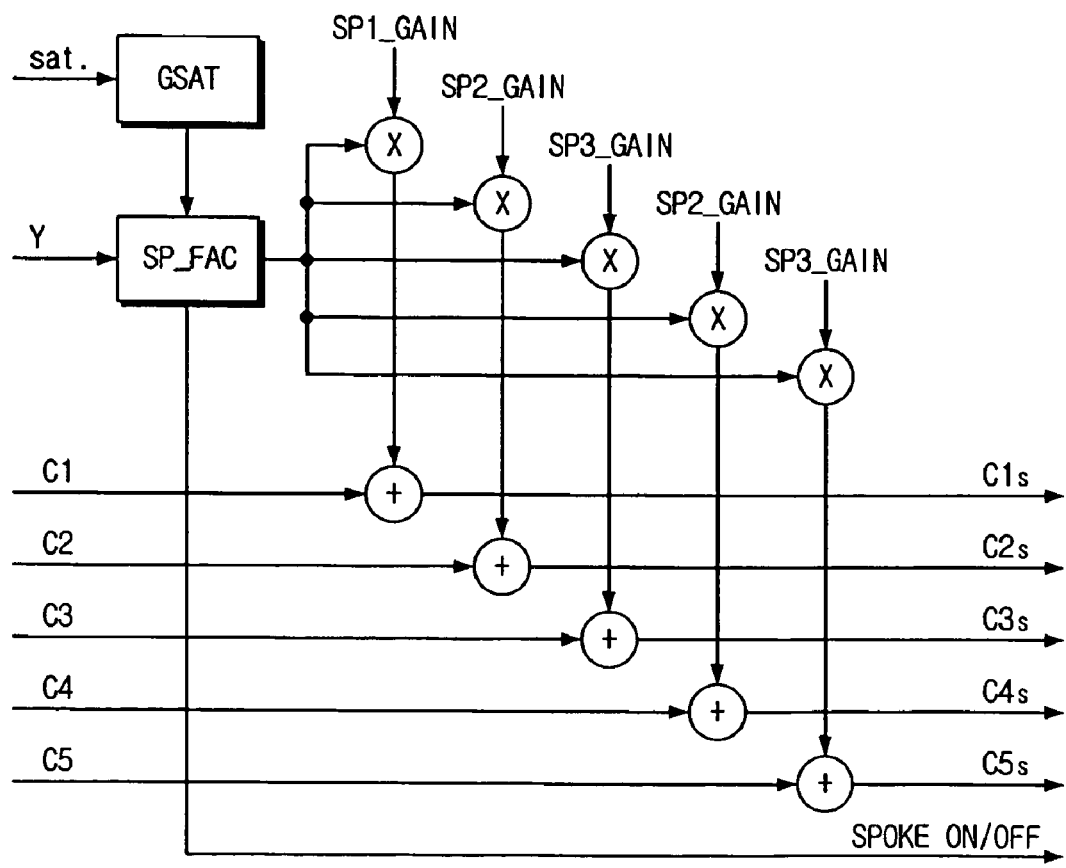

FIGS. 9A and FIG. 9B are views illustrating the spoke application unit 407 of the color-spoke processing apparatus of FIG. 4.

FIG. 9A illustrates a WYV input color signal, and FIG. 9B illustrates a five-channel input color signal.

As mentioned above, it should be understood that although various embodiments of the present general inventive concept has been described with reference to spoke areas of the color wheel, the various embodiments can also be applied to n-channel sequential color devices.

As stated above, unlike the prior art, the present general inventive concept can prevent color distortion phenomena, since an output image signal is made linear by using the spoke areas and adjusting the input color signal in the low-saturation region of a sequential color display device. Further, the present general inventive concept can maintain continuity of an image signal and a color balance by controlling a magnitude by which luminance of an input color signal is increased by certain spoke areas according to the luminance of input color signal.

Further, the use of the spoke areas increases the luminance of white color of an image signal, so the brightness and contrast can be intensified.

Further, the spoke areas can be selectively used to control the luminance increase and color temperature of an image signal.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A spoke-processing apparatus usable with sequential color display devices, comprising:
   a saturation calculation unit to calculate a color saturation of an input color signal and to determine whether the calculated color saturation is less than or equal to a first threshold;
   a luminance calculation unit to determine whether the input color signal has a luminance that is greater than a second threshold when the calculated color saturation is determined by the saturation calculation unit to be less than or equal to the first threshold;
   a signal intensifying/lessening ratio calculation unit to determine whether to increase the luminance of the input color signal using spoke areas according to the determination of the luminance calculation unit, and to calculate a signal adjustment ratio to intensify or to lessen the input color signal based on whether the luminance of the input color signal is increased by the spoke areas; and a spoke application unit to output an output color signal having luminance of respective color components intensified or lessened according to the calculated signal adjustment ratio.

2. The spoke-processing apparatus as claimed in claim 1, further comprising:
a spoke selection unit to select one or more spoke areas to be used out of a plurality of spoke areas created by one of neighboring color segments of a color wheel and a switching time of an n-channel sequential color display.

3. The spoke-processing apparatus as claimed in claim 1, wherein the saturation calculation unit calculates the color saturation based on the equation below:

if $max1$ is equal to 0, the color saturation $sat = 0$, and if $max1$ is not equal to 0, $$\text{color saturation } sat = \frac{max1 - min1}{max1},$$

where max1 represents a maximum value function of the input color signal, and min1 represents a minimum value function of the input color signal.

4. The spoke-processing apparatus as claimed in claim 1, wherein the signal intensifying/lessening ratio calculation unit calculates the signal adjustment ratio based on the equation below:

if $Y<yth$, $sp\_fac=G_{sat} \times Y$, if $Y \geq yth$, $sp\_fac=G_{sat} \times Y-1$, where sp_fac represents the signal adjustment ratio, Y represents the luminance of the input color signal, $G_{sat}$ represents a gain of the color saturation, and yth represents the second threshold.

5. The spoke-processing apparatus as claimed in claim 4, wherein the gain of the color saturation $G_{sat}$ is calculated by the equation below:

if $sat > sth2$, $G_{sat} = f(sat) = 0$, if $sth1 < sat \leq sth2$, $G_{sat} = f(sat) = \frac{sth2 - sat}{sth2 - sth1}$, and if $sat \leq sth1$, $Gsat = f(sat) = 1$ where $G_{sat}$ represents the gain of the color saturation, sth2 represents the first threshold, and sth1 represents a saturation value as a reference to distinguish a middle color saturation from a low color saturation.

6. The spoke-processing apparatus as claimed in claim 1, wherein the signal intensifying/lessening ratio calculation unit calculates the signal adjustment ratio to be applied to the input color signal based on the equation below:

if $Y<yth$, $sp\_fac=G_{sat} \times Y$, if $Y \geq yth$, $sp\_fac=G_{sat} \times Y-1$, where sp_fac represents the signal adjustment ratio, Y represents the luminance of the input color signal, $G_{sat}$ represents a gain of the color saturation, and yth represents the second threshold.

7. The spoke-processing apparatus as claimed in claim 1, wherein the spoke application unit calculates the output color signal based on the equation below:

$C1^* = C1 + sp\_fac \times sp1_{gain}$ where C1* represents the output color signal having a luminance intensified or lessened by the spoke application unit according to the signal adjustment ratio, C1 represents the input color signal, $sp1_{gain}$ represents a control gain of the input color signal, and sp_fac represents the signal adjustment ratio calculated by the signal intensifying/lessening ratio calculation unit.

8. A spoke-processing apparatus to increase luminance in a sequential color display comprising:
an input unit to receive an input color signal having a color saturation and a luminance level;
a spoke determination unit to determine whether one or more color transition regions of the sequential color display are to be used to increase the luminance level of the input color signal according to the color saturation of the input color signal and the luminance level of the input color signal; and
an adjustment unit to adjust an intensity of the input color signal by either reducing the intensity or increasing the intensity of the input color signal input from the input unit into the spoke determination unit to prevent large changes in the luminance level of the input color signal.

9. The apparatus as claimed in claim 8, wherein the input color signal comprises a plurality of components that are separately processed.

10. The apparatus as claimed in claim 8, further comprising:
a spoke selection unit to select the one or more color transition areas from among a plurality of color transition areas according to a desired increase in luminance.

11. The apparatus as claimed in claim 8, wherein the spoke determination unit determines whether the color saturation is in a low saturation region, and the adjustment unit increases the intensity of the input color signal when the one or more color transition regions are not used to increase the luminance level and decreases the intensity of the input color signal when the one or more transition regions are used to increase the luminance level such that luminance levels in the low saturation region do not abruptly change.

12. The apparatus as claimed in claim 8, wherein the spoke determination unit comprises a color saturation unit to determine whether the input color signal is in one of a low color saturation region, a middle color saturation region, and a high color saturation region, to determine that the one or more color transition regions are used to increase the luminance level of the input color signal when the input color signal is in the low or middle color saturation region, and to determine that the one or more color transition regions are not used to increase the luminance level of the input color signal when the input color signal is in the high color saturation region.

13. The apparatus as claimed in claim 12, wherein the spoke determination unit further comprises a luminance unit to determine whether the luminance level is greater than a predetermined luminance threshold if the spoke determination unit determines that the input color signal is in the low or middle color saturation region, to determine that the one or more color transition regions are used to increase the luminance level of the input color signal when the luminance level is greater than the predetermined luminance threshold, and to determine that the one or more color transition regions are not used to increase the luminance level of the input color signal when the luminance level is less than the predetermined luminance threshold.

14. The apparatus as claimed in claim 12, wherein the one or more color transition regions increase the luminance level of the input color signal by a greater amount when the color saturation is a low color saturation than when the color saturation is a middle color saturation.

15. The apparatus as claimed in claim 8, wherein the sequential color display comprises one of a color wheel driven display device and an n-channel sequential color display device.

16. The apparatus as claimed in claim 8, wherein the adjustment unit adjusts the luminance level of the input color signal by reducing or increasing the intensity of the input color signal.

17. The apparatus as claimed in claim 8, wherein the spoke determination unit uses the one or more color transition regions to increase the luminance level of the input color signal when the input color signal is not in a high color saturation region and when the luminance level is greater than a predetermined luminance threshold.

18. The apparatus as claimed in claim 8, wherein the adjustment unit increases the intensity of the input color signal when the spoke determination unit determines that the one or more color transition regions are not used to increase the luminance level of the input color signal according to a first ratio and decreases the intensity of the input color signal when the spoke determination unit determines that the one or more color transition regions are used to increase the luminance level of the input color signal according to a second ratio.

19. A spoke-processing apparatus to increase luminance in a sequential color display comprising:
 a spoke determination unit to receive an input color signal having a luminance level and a saturation level and to provide an increase in the luminance level of the input color signal of a first magnitude using one or more color transition regions of the sequential color display or not provide an increase in the luminance level according to the color saturation of the input color signal and the luminance level of the input color signal; and
 an adjustment unit to adjust the luminance level of the input color signal by a second magnitude to prevent large changes in the luminance level of the input color signal.

20. A spoke processing apparatus to increase luminance in a sequential color display comprising:
 a spoke determination unit to receive an input color signal and to determine whether to increase a luminance level of the input color signal by a predetermined amount using one or more color spokes according to brightness and color characteristics of the received input color signal; and
 an intensity unit to decrease an increased luminance level to a first luminance level and to increase an un-increased luminance level to a second luminance level.

21. A color transition region processing apparatus usable with a sequential color display, comprising:
 an input unit to receive an input color signal having a plurality of color components;
 a spoke determination unit to determine whether one or more color transition regions are used to increase a luminance of the plurality of color components of the input color signal;
 an adjustment unit to determine a signal adjustment ratio to adjust the plurality of color components of the input color signal according to whether the luminance of the plurality of color components of the input color signal is increased;
 a plurality of multipliers to obtain a plurality of products by multiplying the signal adjustment ratio by a plurality of gain control values that correspond to the plurality of color components of the input color signal; and
 a plurality of adders to add the plurality of products to the corresponding color components of the input color signal to obtain an output color signal having a plurality of color components having an increased luminance.

22. A spoke-processing method usable in sequential color display devices, the method comprising:
 calculating a color saturation of an input color signal and determining whether the calculated color saturation is less than or equal to a first threshold;
 determining whether the input color signal has a luminance that is greater than a second threshold when the calculated color saturation is determined to be less than or equal to the first threshold;
 determining whether to increase the luminance of the input color signal using spoke areas when the luminance of the color input signal is greater than the second threshold and the calculated color saturation is less than or equal to the first threshold, and calculating a signal adjustment ratio to intensify or to lessen the input color signal based on whether the luminance of the input color signal is increased by the spoke areas; and
 outputting an output color signal having luminance of respective color components intensified or lessened according to the calculated signal adjustment ratio.

23. The spoke-processing method as claimed in claim 22, further comprising:
 selecting one or more spoke areas to be used from among a plurality of spoke areas created by one of neighboring color segments of a color wheel and a switching time of an n-channel sequential color display.

24. The spoke-processing method as claimed in claim 22, wherein the color saturation of the input color signal is calculated based on the equation below:

$$\text{if } max1 \text{ is equal to } 0, \text{ the color saturation } sat = 0, \text{ and}$$

$$\text{if } max1 \text{ is not equal to } 0,$$

$$\text{color saturation } sat = \frac{max1 - min1}{max1},$$

where max1 represents a maximum value function of the input color signal, and min1 represents a minimum value function of the input color signal.

25. The spoke-processing method as claimed in claim 22, wherein the signal adjustment ratio is calculated based on the equation below:

$$\text{if } Y < yth,\ sp\_fac = G_{sat} \times Y,$$

$$\text{if } Y \geq yth,\ sp\_fac = G_{sat} \times Y - 1,$$

where sp_fac represents the signal adjustment ratio of the input color signal, Y denotes the luminance of the input color signal, $G_{sat}$ represents a gain of the color saturation, and yth represents the second threshold.

26. The spoke-processing method as claimed in claim 25, wherein the gain of the color saturation $G_{sat}$ is calculated by the equation below:

$$\text{if } sat > sth2,\quad G_{sat} = f(sat) = 0,$$

$$\text{if } sth1 < sat \leq sth2,\quad G_{sat} = f(sat) = \frac{sth2 - sat}{sth2 - sth1}, \text{ and}$$

$$\text{if } sat \leq sth1,\quad Gsat = f(sat) = 1$$

where $G_{sat}$ represents the gain of the color saturation, sth2 represents the first threshold, and sth1 represents a saturation value as a reference to distinguish a middle color saturation from a low color saturation.

27. The spoke-processing method as claimed in claim 22, wherein the signal adjustment ratio applied to the input signal is calculated based on the equation below:

if $Y<yth$, $sp\_fac=G_{sat} \times Y$, if $Y \geq yth$, $sp\_fac=G_{sat} \times Y-1$, where sp_fac represents the signal adjustment ratio, Y denotes the luminance of the input color signal, $G_{sat}$ represents a gain of the color saturation, and yth represents the second threshold.

28. The spoke-processing method as claimed in claim 22, wherein the output color signal is calculated based on the equation below:

$C1^* = C1 + sp\_fac \times sp1_{gain}$ where $C1^*$ represents the output color signal having a luminance that is intensified or lessened according to the signal adjustment ratio, C1 represents the input color signal, $sp1_{gain}$ represents a control gain of the input color signal, and sp_fac represents the signal adjustment ratio.

29. The spoke-processing method as claimed in claim 22, wherein, if the color saturation of the input color signal is greater than the first threshold, the luminance of the input color signal is not increased by the spoke areas.

30. The spoke-processing method as claimed in claim 22, wherein, if the luminance of the input color signal is greater than the second threshold, the luminance of the input color signal is increased by the spoke areas, and if the luminance of the input color signal is less than the second threshold, the luminance of the input color signal is not increased by the spoke areas.

31. The spoke-processing method as claimed in claim 22, wherein, if the luminance of the input color signal is greater than the second threshold, the luminance of the input color signal is increased by spoke areas and decreased to a first desired luminance according to the signal adjustment ratio, and if the luminance of the input color signal is less than the second threshold, the luminance of the input color signal is increased up to a second desired luminance according to the signal adjustment ratio.

32. A method of processing spokes to increase luminance in a sequential color display, the method comprising:
receiving an input color signal having a color saturation and a luminance level;
determining whether one or more color transition regions of the sequential color display are to be used to increase the luminance level of the input color signal according to the color saturation of the input color signal and the luminance level of the input color signal; and
adjusting an intensity of the input color signal by either reducing the intensity or increasing the intensity of the received input color signal input to prevent large changes in the luminance level of the input color signal.

33. The method as claimed in claim 32, wherein the input color signal comprises a plurality of components that are separately processed.

34. The method as claimed in claim 32, further comprising:
selecting the one or more color transition areas from among a plurality of color transition areas according to a desired increase in luminance.

35. The method as claimed in claim 32, wherein the determining of whether the one or more color transition regions of the sequential color display are to be used to increase the luminance level of the input color signal comprises determining whether the color saturation of the input signal is in a low saturation region, and increasing the intensity of the input color signal when the one or more color transition regions are not used to increase the luminance level and decreasing the intensity of the input color signal when the one or more transition regions are used to increase the luminance level such that luminance levels in the low saturation region do not abruptly change.

36. The method as claimed in claim 32, wherein the determining of whether the one or more color transition regions of the sequential color display are to be used to increase the luminance level of the input color signal comprises determining whether the input color signal is in one of a low color saturation region, a middle color saturation region, and a high color saturation region, determining that the one or more color transition regions are used to increase the luminance level of the input color signal when the input color signal is in the low or middle color saturation region, and determining that the one or more color transition regions are not used to increase the luminance level of the input color signal when the input color signal is in the high color saturation region.

37. The method as claimed in claim 36, wherein the determining of whether the one or more color transition regions of the sequential color display are to be used to increase the luminance level of the input color signal further comprises determining whether the luminance level is greater than a predetermined luminance threshold if it is determined that the input color signal is in the low or middle color saturation region, determining that the one or more color transition regions are used to increase the luminance level of the input color signal when the luminance level is greater than the predetermined luminance threshold, and determining that the one or more color transition regions are not used to increase the luminance level of the input color signal when the luminance level is less than the predetermined luminance threshold.

38. The method as claimed in claim 36, wherein the one or more color transition regions increase the luminance level of the input color signal by a greater amount when the color saturation is a low color saturation than when the color saturation is a middle color saturation.

39. The method as claimed in claim 32, wherein the sequential color display comprises one of a color wheel driven display device and an n-channel sequential color display device.

40. The method as claimed in claim 32, wherein the adjusting of the intensity of the input color signal comprises adjusting the luminance level of the input color signal by reducing or increasing the intensity of the input color signal.

41. The method as claimed in claim 32, wherein the determining of whether the one or more color transition regions of the sequential color display are to be used to increase the luminance level of the input color signal comprises using the one or more color transition regions to increase the luminance level of the input color signal when the input color signal is not in a high color saturation region and when the luminance level is greater than a predetermined luminance threshold.

42. The method as claimed in claim 32, wherein the adjusting of the intensity of the input color signal comprises increasing the intensity of the input color signal when it is determined that the one or more color transition regions are not used to increase the luminance level of the input color signal according to a first ratio and decreases the intensity of the input color signal when the spoke determination unit determines that the one or more color transition regions are used to increase the luminance level of the input color signal according to a second ratio.

43. A method of processing spokes to increase luminance in a sequential color display, the method comprising:
    receiving an input color signal having a luminance level and a saturation level and providing an increase in the luminance level of the input color signal of a first magnitude using one or more color transition regions of the sequential color display or not providing an increase in the luminance level according to the color saturation of the input color signal and the luminance level of the input color signal; and
    adjusting the luminance level of the input color signal by a second magnitude different from the first magnitude to prevent large changes in the luminance level of the input color signal.

44. A method of processing spokes to increase luminance in a sequential color display, the method comprising:
    receiving an input color signal and determining whether to increase a luminance level of the input color signal by a predetermined amount using one or more color spokes according to brightness and color characteristics of the received input color signal; and
    adjusting intensity of the input color signal to decrease an increased luminance level to a first luminance level and to increase an un-increased luminance level to a second luminance level.

45. A method of processing a color transition region usable with a sequential color display, the method comprising:
    receiving an input color signal having a plurality of color components;
    determining whether one or more color transition regions are used to increase a luminance of the plurality of color components of the input color signal;
    determining a signal adjustment ratio to adjust the plurality of color components of the input color signal according to whether the luminance of the plurality of color components of the input color signal is increased;
    multiplying the signal adjustment ratio by a plurality of gain control values that correspond to the plurality of color components of the input color signal to obtain a plurality of products; and
    adding the plurality of products to the corresponding color components of the input color signal to obtain an output color signal having a plurality of color components having an increased luminance.

* * * * *